March 22, 1927.

G. D. ANGLE 1,622,172

INTAKE MANIFOLD ARRANGEMENT FOR W-TYPE INTERNAL COMBUSTION ENGINES

Filed May 29, 1923 3 Sheets-Sheet 1

March 22, 1927.

G. D. ANGLE 1,622,172

INTAKE MANIFOLD ARRANGEMENT FOR W-TYPE INTERNAL COMBUSTION ENGINES

Filed May 29, 1923

Inventor

Glenn D. Angle,

By Robert H. Young

Attorney

March 22, 1927. 1,622,172
G. D. ANGLE
INTAKE MANIFOLD ARRANGEMENT FOR W-TYPE INTERNAL COMBUSTION ENGINES
Filed May 29, 1923 3 Sheets-Sheet 3

Inventor
Glenn D. Angle,
By Robert A. Young,
Attorney

Patented Mar. 22, 1927.

1,622,172

UNITED STATES PATENT OFFICE.

GLENN D. ANGLE, OF DAYTON, OHIO.

INTAKE-MANIFOLD ARRANGEMENT FOR W-TYPE INTERNAL-COMBUSTION ENGINES.

Application filed May 29, 1923. Serial No. 642,260.

This invention relates to an intake manifold arrangement or system for W-type internal combustion engines.

It has been found a difficult problem to design interchangeable intake manifolds for W-type internal combustion engines. When manifolds of different designs are employed, a great deal of experimenting is required to obtain uniform distribution of the gas to all cylinders. The design herein described and shown overcomes these difficulties and provides a symmetrical arrangement of units.

In the accompanying drawings.

Figure 1:
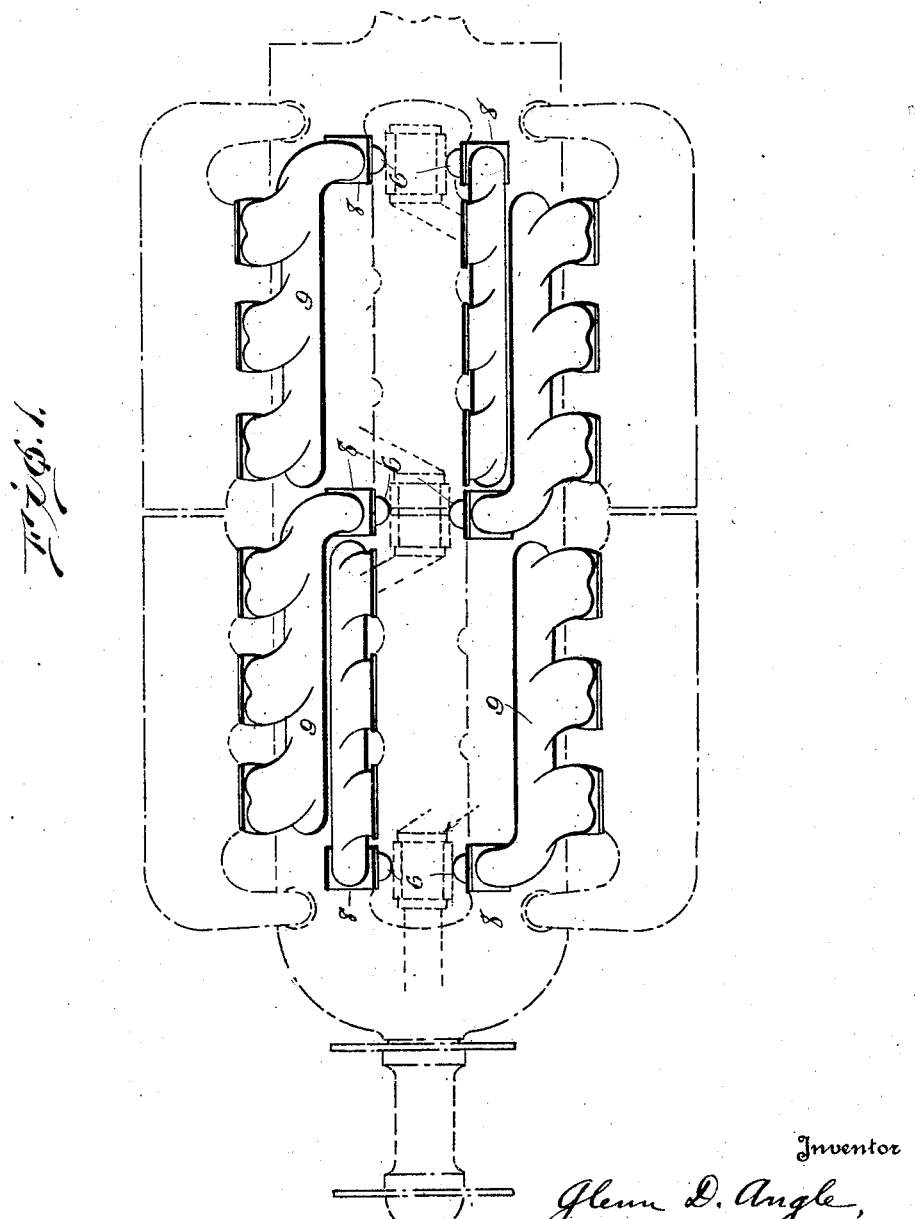
Figure 1 is a plan view showing the intake manifold arrangement in the relation thereof to internal combustion engine of the W-type.
Figure 2:
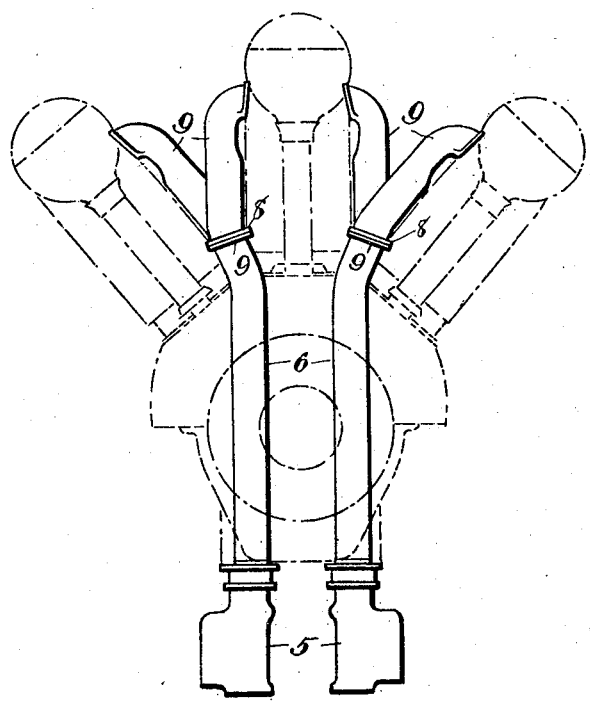
Figure 2 is an end elevation thereof.
Figure 3:
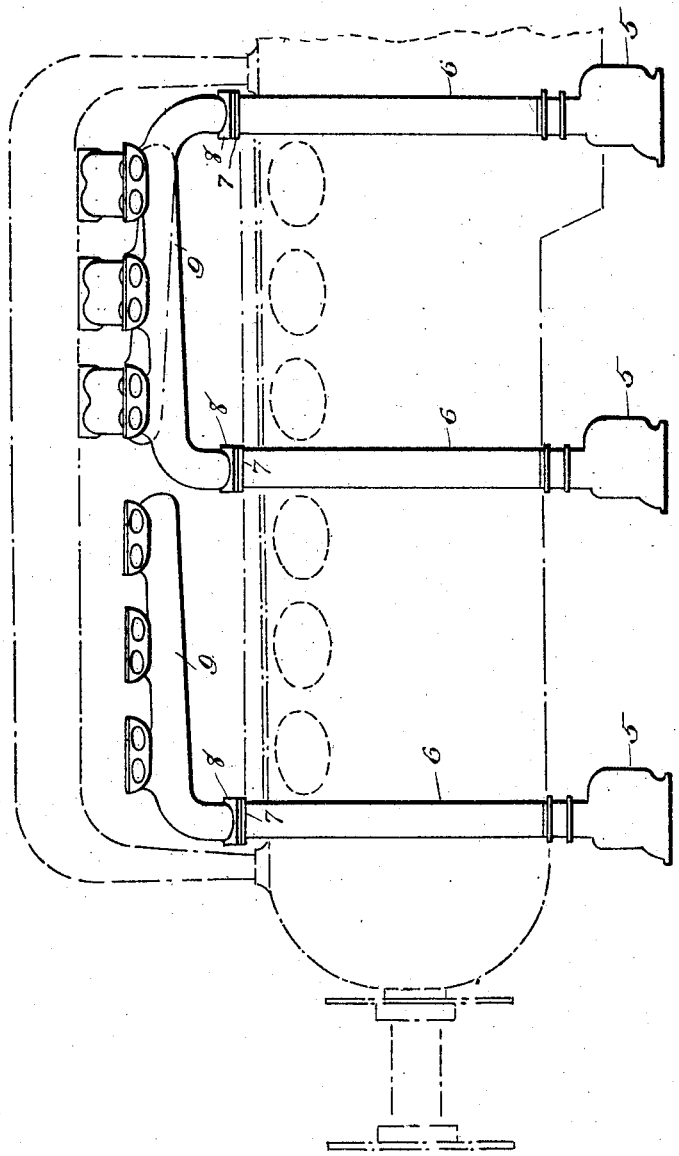
Figure 3 is a side elevation showing the arrangement of intake manifolds at one side of the vertical center line of the Figure 2.

In the W-type internal combustion engine the carbureters indicated at 5 are located beneath the engine so as to receive air from outside the cowling and thereby eliminate the fire hazard of engine back firing. The gas is fed into long induction pipes 6, which pass out in a substantially vertical direction through the crank case compartment and opposite the crank shaft main bearings and said pipes, where they pass through the crank case are supported by glands at the top and bottom thereof to prevent leakage of oil. The upper end of each induction pipe has a flange 7 which bolts to a corresponding flange 8 on the intake manifold 9, the induction pipes and the intake manifolds being similar for any group of cylinders.

Differing from a previous design, covered in my prior application, Serial No. 434,135, filed December 30, 1920, in which the induction pipes were located in line with the intermediate main bearings of a six-throw seven-bearing crank shaft and the two remaining positions being used as crank case breather positions, this design has the induction pipes located opposite and in transverse alinement with the center and the two end bearings for any engine of the W-type with six cylinders in line. In a twelve-cylinder W-type engine where four cylinders are fed from one manifold, of these positions certain ones may be selected which prove to give the greatest advantage in the design. The difference in the location of the induction pipes is due to the design of the engine, the lower speed engine not requiring intermediate bearings of the length sufficient to provide room for the necessary diameter of induction pipes.

The key to the present arrangement is the fact that owing to the opposite direction of rotation of the cam shaft of the center row of cylinders, which makes it different from the cam shafts of the two side rows, permits the intake and exhaust sides of each group of three to be reversed without requiring any other additional special parts. The result is that the manifold and other adjoining parts are identical, thereby avoiding the use of right and left hand manifold units.

I claim:

1. In combination with a W-type internal combustion engine, an intake manifold system comprising parallel series of induction pipes in substantially upright position and arranged on opposite sides of and in transverse alinement with the center and two end main bearings, and intake manifold units extending in a fore and aft direction from said induction pipes, all of said intake manifold units being identical and interchangeable.

2. In combination with a W-type internal combustion engine, an intake manifold system comprising parallel series of induction pipes in substantially upright position and arranged on opposite sides of and in transverse alinement with the center and two end main bearings, and intake manifold units extending in a fore and aft direction from said induction pipes, all of said intake manifold units being identical and interchangeable, some of said units being disposed reversely to the others.

3. In combination with a W-type internal combustion engine, an intake manifold system comprising parallel series of induction pipes in substantially upright position and arranged on opposite sides of and in transverse alinement with the center and two end main bearings, said induction pipes extending through the crank shaft compartment, and intake manifold units extending in a fore and aft direction from said induction pipes, all of said intake manifold units being identical and interchangeable.

4. In combination with a W-type internal combustion engine, an intake manifold system comprising parallel series of induction pipes in substantially upright position and arranged on opposite sides of and in transverse alinement with the center and two end main bearings, and intake manifold units extending in a fore and aft direction from said induction pipes, all of said intake manifold units being identical and interchangeable, and a carbureter on the lower end of each of said induction pipes beneath the engine crank case.

5. In combination with a W-type internal combustion engine, an intake manifold system comprising parallel series of symmetrically arranged induction pipes in substantially upright position and arranged on opposite sides of and adjacent to the center and two end main bearings, and intake manifold units extending in a fore and aft direction from said induction pipes, all of said intake manifold units being identical and interchangeable, an induction pipe located adjacent to each end main bearing being connected to the intermediate bank of cylinders of the engine.

In testimony whereof I affix my signature.

GLENN D. ANGLE.